United States Patent [19]

Chinh

[11] Patent Number: 5,556,238
[45] Date of Patent: Sep. 17, 1996

[54] PROCESS AND APPARATUS FOR INTRODUCING A SOLID INTO A REACTOR

[75] Inventor: Jean-Claude Chinh, Lavera, France

[73] Assignee: BP Chemicals Limited, London, England

[21] Appl. No.: 238,929

[22] Filed: May 6, 1994

[30] Foreign Application Priority Data

May 19, 1993 [FR] France .................................. 93 06331

[51] Int. Cl.⁶ .................................................. B65G 53/16
[52] U.S. Cl. .......................................... 406/136; 406/146
[58] Field of Search ............................ 406/92, 136, 137, 406/138, 146

[56] References Cited

U.S. PATENT DOCUMENTS

| | | | |
|---|---|---|---|
| 1,276,653 | 8/1918 | Herbert et al. | 406/136 |
| 2,870,565 | 1/1959 | Martin | 406/136 |
| 3,288,537 | 11/1966 | Hitch | 406/136 |
| 4,082,513 | 4/1978 | Andon et al. | 406/124 |
| 4,687,381 | 8/1987 | Dumain et al. | 406/146 X |

FOREIGN PATENT DOCUMENTS

| | | |
|---|---|---|
| 0101098 | 2/1984 | European Pat. Off. . |
| 0157584 | 10/1985 | European Pat. Off. . |

OTHER PUBLICATIONS

Patent Abstracts of Japan—vol. 8, No. 130 (C–229) (1567) Jun. 16, 1984—Abstract of JP–152771—Mar. 8, 1984 B01J–03/02.

*Primary Examiner*—Andrew C. Pike
*Attorney, Agent, or Firm*—Brooks Haidt Haffner & Delahunty

[57] ABSTRACT

A process and an apparatus introduce fine particles of a solid into a reactor with the help of a feed enclosure connected to the reactor through an injection pipe. The process comprises (a) introducing the solid into the feed enclosure wherein most of the solid particles settle at rest and then (b) introducing a gas into the feed enclosure so that the solid particles are suspended by the gas to form a solid particle suspension entrained in a dilute-phase conveying system by the gas into the reactor through the injection pipe. The invention is particularly useful for introducing particles of a solid catalyst into a gas-phase polymerization reactor.

12 Claims, 1 Drawing Sheet

PROCESS AND APPARATUS FOR INTRODUCING A SOLID INTO A REACTOR

The present invention relates to a process for introducing a solid into a reactor and to an apparatus allowing the process to be carried out.

From U.S. Pat. No. 4,082,513 it is known to introduce a solid catalyst into a reactor with the aid of an apparatus consisting essentially of an introduction enclosure connected to the reactor through the intermediacy of an injection conduit. The catalyst is first of all introduced into the introduction enclosure which is then pressurized by an introduction of gas. The catalyst is next introduced into the injection conduit, in which it is fluidized as far as the reactor entry by means of another introduction of gas. The latter is performed by a pipe which emerges directly into the injection conduit. During the introduction of gas into the introduction enclosure, the catalyst may be compacted and this can make its introduction into the injection conduit difficult. Furthermore, this process has the disadvantage of requiring two different introductions of gas, thereby causing a considerable introduction of gas into the reactor.

European Patent Application No. 0 101 098 discloses a process for conveying a particulate solid fuel from a container successively into a hopper and a vessel, and then into a reactor with the help of a pneumatic transport. However, a fluidization gas is used for maintaining the solid fuel in a fluidized state in the container, the hopper, and the vessel, and a carrier gas is used for conveying the solid fuel from the vessel into the reactor through the pneumatic transport.

French Patent Application No. 2 562 077 discloses a process and an apparatus for introducing a powdery catalyst into a fluidized bed reactor for a gas phase polymerization of olefins. However, the powdery catalyst is conveyed into the reactor in a "plug flow" or "packed bed" mode, i.e., in a dense-phase conveying system particularly in horizontal line orientations.

A process for introducing solid into a reactor, which preferably may be under a relatively high pressure, has now been found, in the course of which the solid is not compacted as in known processes using a dense-phase conveying system. Furthermore, it requires only a single introduction of gas. The process permits a good entry of the solid into the reactor as well as very good dispersion of the solid in the reactor, particularly when a gas phase reactor such as a fluidized bed reactor is used. In that case, if the reaction occuring in the reactor is exothermic, the use of the process of the present invention makes it possible to reduce or to eliminate hot spots in the reactor.

Figure 1:
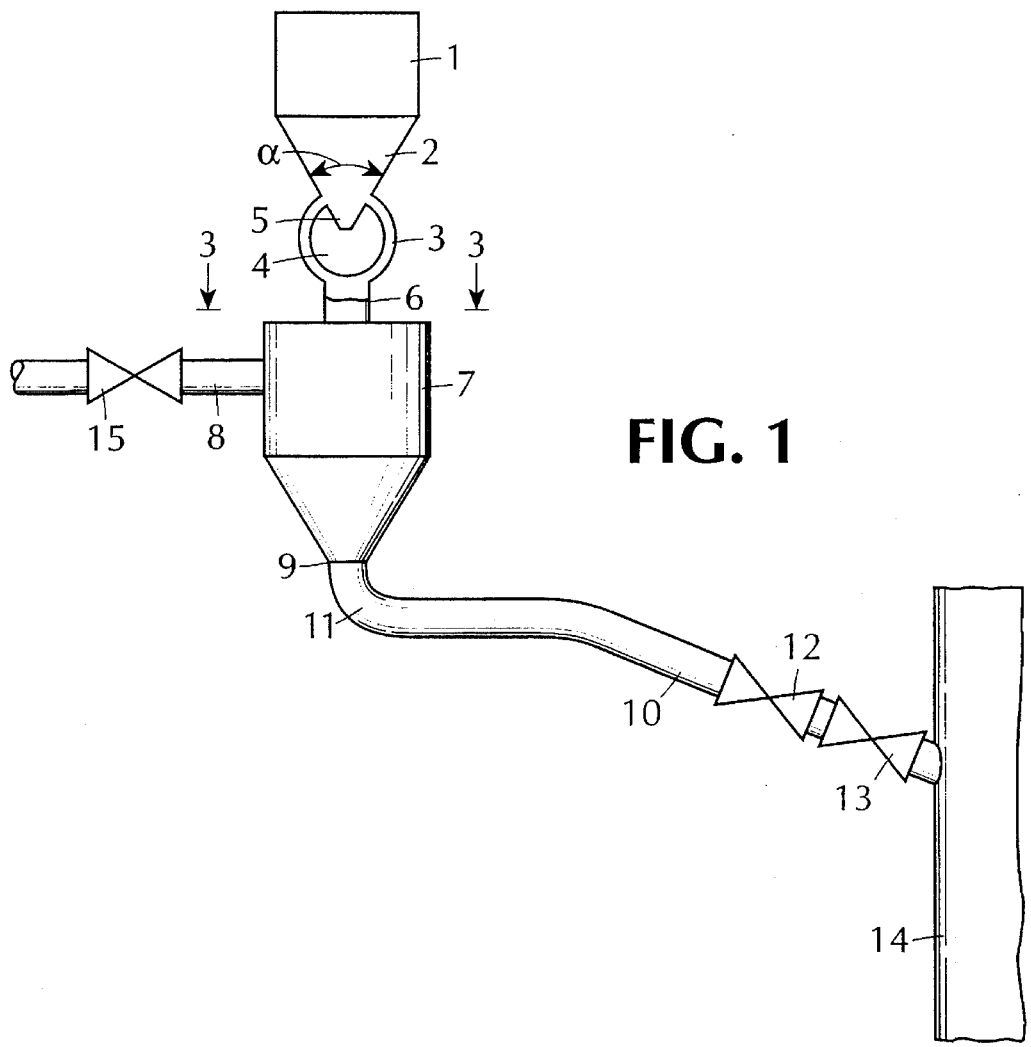
FIG. 1 illustrates diagramatically the apparatus of the invention which can be used in the process of the invention.

The subject of the invention is a process for introducing a solid into a reactor with the aid of a feed enclosure connected to the reactor through an injection pipe, characterized in that the process comprises:

(a) introducing the solid into the feed enclosure wherein most of the solid settles at rest, and then (b) introducing a gas into the feed enclosure so that the solid initially at rest is suspended by the gas in the feed enclosure to form a suspension of the solid entrained in a dilute-phase conveying system by the gas from the feed enclosure into the reactor through the injection pipe.

During the first stage of the process, the solid is introduced into a feed enclosure. The introduction of solid is preferably performed through the upper part and in most cases through the top of the feed enclosure. The solid may be delivered into the feed enclosure by a pneumatic transport through a gas/solid separator, e.g., a cyclone or by a storage vessel through a delivery means, e.g., a feed valve or a rotary valve. More particularly, the solid may be delivered by a gravity flow into the feed enclosure, e.g., from the upper part or the top of the feed enclosure to the bottom of the said feed enclosure. During this stage the feed enclosure may contain an initial gas under pressure, e.g., from 0.1 to 5 MPa. The initial gas is generally an inert gas such as nitrogen. When the process of the invention is used sequentially, i.e., in an introduction sequence mode, the gas initially present in the feed enclosure during the first stage is the gas remaining in the feed enclosure at the end of the second stage of the preceding introduction sequence. The feed enclosure generally has a volume which is greater than the volume of solid introduced and which represents advantageously from 2 to 20, preferably from 3 to 10 times the volume of solid introduced. The volume is chosen so as to make it easily possible to suspend the solid in the gas during the second stage of the process.

During the first stage most of the solid introduced into the feed enclosure settles at rest in the feed enclosure, particularly by a gravity flow in the lower part of the feed enclosure, e.g., on the bottom surface of the feed enclosure. Most of the solid lies in the feed enclosure in order to be capable of being suspended in gas during the second stage of the process. In particular, it is highly desired that the solid does not flow, for example under gravity, in a large quantity externally to the feed enclosure, e.g., into the injection pipe connecting the feed enclosure with the reactor. Very advantageously, more than 50% and more particularly more than 75% by weight of the solid introduced should settle at rest in the feed enclosure. However a minor amount of the solid may settle externally to the feed enclosure, e.g., in the injection pipe.

During the second stage of the process, the solid initially at rest for the most part in the feed enclosure is conveyed into the reactor through the injection pipe. A gas is introduced into the feed enclosure containing the solid at rest. When the reactor is under a relatively high pressure, the injection pipe is generally provided with an entry means, e.g., an entry valve, which is opened in order to bring the feed enclosure into communication with the reactor via the injection pipe. When the desired amount of the solid is introduced into the reactor, the entry means may preferably be closed until the next sequence of the solid introduction, particularly if the content of the reactor reacts or interacts with the solid. The introduction of gas in the feed enclosure may be carried out by the opening of a valve and is advantageously performed continuously during all the second stage, particularly at least from the time when the entry means is opened to the end of the introduction of the solid into the reactor. For this purpose the opening of the entry means can be performed simultaneously with the beginning of the introduction of the gas, e.g., the opening of a gas introduction valve, or afterwards, preferably immediately after, e.g., less than 1 second or from 1 to 5 seconds after the beginning of the introduction of the gas. The opening of the entry means is advantageously control-driven using the beginning of the introduction of the gas into the feed enclosure or the opening of the gas introduction valve.

The introduction of the gas may be performed in any part of the feed enclosure, preferably in the upper part of the feed enclosure and in most cases in the uppermost part. Furthermore, it is preferably performed above the upper level of the solid settled at rest in the feed enclosure, especially in order to prevent plugging of the gas feed conduit. According to the invention during the major part of the second stage a flow of the gas is preferably continuously generated from the point of introduction of the gas in the feed enclosure to the reactor through the injection pipe. The introduction of the gas into the feed enclosure and its flow in the feed enclosure are such that the solid initially at rest in the feed enclosure is suspended by the gas to form a suspension of the solid in the gas. The solid suspension is then entrained in a dilute-phase conveying system by the gas from the feed enclosure into the reactor through the injection pipe. In practice, it is found according to a particularly aspect of the invention that the gas is introduced and flows in the feed enclosure in a manner, e.g., in a direction which produces a swirling action of the gas in the feed enclosure suitable for suspending the solid in the gas, preferably as soon as the gas begins being introduced. It has been noted that the swirling of solid is very advantageously promoted when the introduction of gas is performed tangentially to a wall of the feed enclosure. This wall is preferably vertical. The swirl effect assists in suspending in the gas flow the solid initially settled in the feed enclosure to form a suspension of the solid in the gas, in diluting and homogenizing the solid in the suspension to form a uniform flow regime. The dilution of the solid by the gas is generally such that from 1 to 20 kg, preferably 2 to 15 kg, especially from 5 to 10 kg of solid are introduced into the feed enclosure per $m^3$ of gas. The type of the flow of the solid suspension in the feed enclosure and the injection pipe is equivalent to a dilute-phase conveying system such as defined by N. P. CHEREMISINOFF and P. N. CHEREMISINOFF in "Hydrodynamics of Gas-Solids Fluidization" (1984) edited by Gulf Publishing Company, Houston, Tex. (USA), chapter 12 ("Considerations in Pneumatic Transport") from page 543 to page 570, and more particularly may correspond to the conveying system of the zone 1 in FIGS. 12—12 and 12–13 at pages 564 and 565. The flow regime of the solid suspension in the injection pipe, particularly in horizontal line orientations, is observed in the present dilute-phase transport at a gas velocity above the "saltation velocity". The "saltation velocity" is defined as the minimum velocity which will prevent solid deposition on the floor of the pipe. At gas velocities above saltation, the solid flow appears dispersed and greatly resembles the uniform flow regime observed in vertical ascending flows. That is, the solid is suspended and moves along with the gas, and for the most part is uniformly distributed across the pipe. In this regime the pressure drop increases with increasing gas velocity. The gas velocity in the injection pipe is preferably equal to or higher than the "pickup velocity" which is closely related to the "saltation velocity" and is defined as being the fluid velocity required to resuspend a solid initially at rest on the bottom of a pipe. An extensive review of "saltation velocity" can be found in P. J. JONES and L. S. LEUNG, "A Comparison of Correlations for Saltation Velocity in Horizontal Pneumatic Conveying" in Ind. Eng. Chem. Proc. Des. Dev., 17, p. 571 (1978). Furthermore, in the process of the present invention, it is unnecessary to carry out an additional introduction of gas directly into the injection pipe in order to facilitate the flow of the solid.

The gas introduced into the feed enclosure is generally introduced at a pressure higher than the pressure in the reactor, e.g., a pressure of 0.05 to 1.5 MPa, preferably 0.1 to 1.0 MPa, higher than the pressure in the reactor. In particular, the pressure of the gas introduced into the feed enclosure is from 0.1 to 5 MPa, while the pressure in the reactor may be from 0.15 to 6.5 MPa, preferably from 0.2 to 6 MPa. The gas is preferably inert towards the solid and, in particular, may be nitrogen.

Generally, as long as the introduction of the whole amount of the solid into the reactor is not finished, the gas pressure in the feed enclosure is preferably maintained higher than the pressure prevailing in the reactor and is practically maintained constant, bearing in mind the continuous introduction of gas during the second stage of the process. At the end of the introduction of the whole amount of the solid into the reactor it is preferred that the gas pressure does not become identical with or lower than that prevailing in the reactor, in order to avoid a possible backflow of the gas from the reactor towards the feed enclosure through the injection pipe.

At the end of the second stage, when the introduction of solid into the reactor is finished, the entry means may be closed. This closure may be performed simultaneously with or preferably immediately after the end of the introduction of solid into the reactor, in order to limit the quantity of gas introduced into the reactor. Furthermore, the introduction of gas into the feed enclosure is also stopped. Stopping the gas may be performed simultaneously with the closure of the entry means or immediately after, e.g., less than 1 second or from 1 to 5 seconds after the closure of the entry means. The end of the introduction of gas into the feed enclosure is advantageously control-driven using the closing of the entry means.

The duration of the second stage of the process may be very fast and can be less than 1 second or from 1 to 10 seconds, e.g. from 3 to 5 seconds.

The two stages of the process may constitute a sequence for introducing a measured quantity of solid into the reactor, i.e., a sequential operation. An introduction sequence may be very fast and may last less than 1 second, advantageously from 1 to 20 seconds e.g., from 5 to 10 seconds in industrial plants. In order to introduce a larger quantity of solid into the reactor, the introduction sequence may be repeated a number of times, this being done at regular intervals. In particular, from 4 to 120, e.g., from 5 to 90, introduction sequences may be carried out per hour.

With reference to FIG. 1 another object of the invention is an apparatus for introducing a solid into a reactor (14) preferably under a relatively high pressure, the apparatus consisting essentially of a feed enclosure (7) comprising:

- a means (4) for introducing the solid into the feed enclosure (7),
- an outlet (9) connected to the reactor (14) through an injection pipe (10),
- a means (11) making it possible to avoid a gravity flow of most of the solid present in the feed enclosure (7) into the injection pipe (10), and
- an inlet of a gas introduction conduit (8) making it possible to suspend in the gas the solid settled at rest in the feed enclosure (7) to form a solid suspension entrained by the gas through the injection pipe (10) into the reactor (14).

The apparatus may include a storage enclosure (1) which may be of a vertical cylindrical shape and the lowest part (2) of which may advantageously be of a conical shape oriented downwards. In industrial plants it may have in most cases a relatively high volume to feed the reactor with solid for a period ranging from 0.5 to 5 days. It may be advantageously provided with an agitating system for solids in order to avoid the formation of solid agglomerates. Furthermore, it may be kept under the atmosphere of an inert gas.

The means (4) for introducing solid into the feed enclosure (7) may consist essentially of a rotary valve comprising a cavity (5) which can communicate alternately with the lowest part (2) of the storage enclosure (1) and with the top (6) of the feed enclosure (7). The rotary valve (4) may be one of the rotary valves described in French Patent Applications No. 2,562,077 and No. 2,587,081.

The feed enclosure (7) may advantageously comprise a vertical cylindrical upper part adjacent to a conical lower part oriented downwards. The gas introduction conduit (8) preferably may have a gas introduction valve (15) and may emerge at the top or near the top of the feed enclosure (7). In a highly advantageous manner the inlet of the gas introduction conduit (8) in the feed enclosure (7) is arranged, e.g., oriented, in a such way that the solid settled at rest in the feed enclosure (7) is suspended in the gas by a swirling effect in the feed enclosure (7). Thus, the gas introduction conduit (8) preferably emerges tangentially to a wall of the feed enclosure (7), e.g., to a vertical wall such as the vertical wall of the cylindrical part of the feed enclosure. The feed enclosure (7) is preferably located below the storage enclosure (1). The feed enclosure (7) may be provided with a means for purging gas, such as a purge conduit.

The apparatus preferably include an entry means (12) when the reactor operates under a relatively high pressure. The entry means (12), when open, makes it possible to bring the feed enclosure (7) and the reactor (14) into communication via the injection pipe (10). On the contrary, when closed, it makes its possible to isolate the feed enclosure (7) from the reactor (14). The entry means (13) is preferably arranged in the injection pipe (10), preferably at the end of the injection pipe, just before its opening in the reactor (14). It also may be the means (11) which makes it possible to avoid a flow of most of the solid into the injection pipe (10). For example, the entry means (12) may be a fast speed full-flow valve or a blow off valve.

The injection pipe (10) connects the reactor (14) with the outlet (9) of the feed enclosure, preferably situated in its lower part and in particular in its lowest part. When the lower part of the feed enclosure consists of a downwards oriented cone, the injection pipe (10) is advantageously connected to the apex of this cone. The length of the injection pipe (10) is generally as short as possible. It may open into the reactor (14) in a direction which may be perpendicular or substantially perpendicular to the wall of the reactor, or in downwards direction which may form with the horizontal plane an angle from 0° to 60°, preferably from 10° to 45°. It preferably does not enter the reactor (14), in order not to perturb its operation. The injection pipe (10) is preferably designed for providing a dilute-phase conveying system working preferably under relatively high pressure, e.g., from 0.1 to 5 MPa with a solid generally consisting of very fine particles, e.g., with a mean diameter from 5 to 200 or 10 to 120 microns. In these particular conditions, the internal diameter of the injection pipe (10) may be in the range from 5 to 25 mm, preferably from 5 to 15 mm.

The apparatus includes a means (11) which makes it possible to avoid, preferably as much as possible, a gravity flow of most of the solid present in the feed enclosure (7) into the injection pipe (10). The means (11) is preferably situated in the injection pipe (10) in the proximity, preferably immediate proximity, of the outlet (9) of the feed enclosure (7). It is preferably located in a such way that its connects the outlet (9) of the feed enclosure with the injection pipe (10). The means (11) may be a valve, e.g., the entry valve (12). The means (11) may also consists of a bend preferably situated just at the outlet (9) of the feed enclosure (7) and connected to the injection pipe (10). The angle of the bend (11) depends to a large extent on the ability of the solid to flow by gravity in the injection pipe. The more easily the solid flows by gravity, the smaller is the angle chosen. The angle of the bend may generally be from 70° to 120° and is in most cases about 90°.

The apparatus may advantageously include a control system which makes it possible to control-drive the opening of the entry means (12) using the beginning of the introduction of the gas into the feed enclosure (7) and/or which makes it possible to control-drive the end of the introduction of the gas using the closure of the entry means (12).

The reactor (14) may be a gas phase reactor such as a fluidized bed and/or a mechanically stirred bed reactor. It may be under pressure, especially of from 0.1 to 5 MPa. The reactor may be used for polymerizing olefins.

The present invention makes it possible to introduce into a reactor, in particular under a relatively high pressure, a solid in suspension in gas. It is particularly advantageous for introducing a solid which has relatively poor flow properties. A test for determining the flowability of a powder is described in EP-A- 0 275 675. The present invention is particularly useful for a powder which can flow freely in a hopper similar to those described in EP-A-0 275 675, especially in a hopper having the following features: the bottom opening diameter of 5 mm, the top opening diameter of 40 mm and the height of 67.5 mm. Furthermore, the present invention is highly recommended for introducing small quantities of solid into a reactor. In particular, it is possible to introduce from 1 to 100 g, in most cases from 1 to 50 g, e.g., from 10 to 50, g of solid per injection sequence. The solid may be a powder consisting of fine or very fine particles having a mass-mean diameter of 5 to 200 microns, preferably 10 to 120 microns, especially 20 to 100 microns or 50 to 100 microns. The solid may have a bulk density of 0.1 to 0.4 g/cm$^3$, e.g., 0.2 to 0.4 g/cm$^3$. When the solid consists of fine or very fine particles, e.g., having a mass-mean diameter of 5 to 200 microns, especially 10 to 120 microns, it is particularly observed that in horizontal line orientations the "saltation velocity" of the solid suspension flowing in the injection pipe of the present invention is generally in the range from 1 to 10 m/sec about, especially from 1 to 7 m/sec. In these conditions, the velocity of the gas flowing in the injection pipe to form a dilute-phase conveying system with a uniform flow regime must be higher than the "saltation velocity", i.e., is preferably comprised between 1 and 50 m/sec, especially in the range from 5 to 30 m/sec.

The solid may be a catalyst for a chemical reaction and in particular for an olefin polymerization reaction such as, for example, a catalyst of Ziegler-Natta type or a catalyst based on chromium oxide activated by thermal treatment, or a prepolymer containing one of these catalysts.

Figure 2:
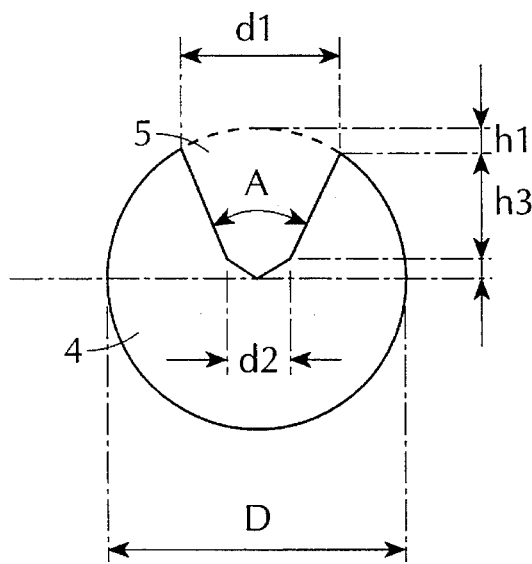
FIG. 2 is an enlarged view of the valve shown in FIG. 1.

FIG. 1 shows diagrammatically an apparatus according to the invention. It consists of a storage enclosure (1) consisting of a vertical cylinder adjacent to a truncated cone in its lower part having at its virtual apex an angle α. The bottom of the storage enclosure is connected to the top of an introduction chamber (3) containing a rotary valve (4) comprising a cavity (5). The bottom of the introduction chamber (3) is connected to the entry (6) of a feed enclosure (7) equipped with a gas introduction conduit (8) provided with a valve (15). The feed enclosure (7) comprises a cylindrical upper part adjacent to a conical lower part which ends with an outlet (9). The outlet (9) of the feed enclosure is connected to a reactor (14) through an injection pipe (10) which is provided with a blow off valve (12) and a relief valve (13) and which opens into the reactor (14). The injection pipe (10) comprises a bend (11) having an angle of 90°, adjacent to the outlet (9). FIG. 2 shows a section of the rotary valve (4) comprising a cavity (5) which has a large opening angle A.

Figure 3:
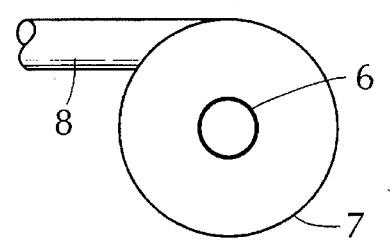
FIG. 3 is a cross-sectional view of a portion of the apparatus shown in FIG. 1 and is taken along the line 3—3 indicated in FIG. 1.

FIG. 3 shows a cross-section along line 3—3 of FIG. 1, of the introduction enclosure (7) which shows that the gas introduction conduit (8) opens into the feed enclosure (7) tangentially to the vertical wall of the cylindrical part of the enclosure.

The following example illustrates the present invention.

EXAMPLE

The operation was carried out with an apparatus identical to that shown in FIGS. 1, 2, and 3. The angle α of the virtual apex of the truncated cone (2) of the storage enclosure (1) was 60°. The dimensions of the rotary valve (4) were: D=44 mm, d1=25 mm, d2 =15 mm, h1=3.9 mm, h3=4.3 mm, and the opening angle A=37.3°. As a result, the volume of the cavity (5) of the rotary valve was 6 cm$^3$.

The feed enclosure (7) consisted of a cylindrical part which had a diameter of 25 mm and a height of 54 mm, and of a conical part which had a height of 15 mm and which ended with an outlet (9) having a diameter of 8 mm. The volume of the feed enclosure (7) was 30 cm$^3$. The injection pipe (10) had an internal diameter of 8 mm and a length of 2 m. The connection between the outlet (9) and the injection pipe (10) consisted of a bend (11) which had an angle of 90°.

The solid used in the present apparatus was a Ziegler-Natta catalyst identical to the solid (S) prepared in Example 1 of EP-A- 0 529 977, apart from the fact that it used a silica powder sold by JOSEPH CROSFIELD AND SONS (Great Britain) under the trade designation "ES 70" R instead of the silica powder "SG 332" R from GRACE. The catalyst consisted of solid particles having a mean diameter of 40 microns and a bulk density of 0.32 g/cm3 and characterized by the above-mentioned flowability test wherein the catalyst flowed freely through the hopper in 2 minutes and 30±10 seconds.

The catalyst was introduced into a fluidized bed reactor (14) identical to those described in the Figure of EP-A-0 529 977 wherein a gas phase polymerization of ethylene was carried out.

The introduction of the catalyst was carried out into the fluidized-bed reactor (14) maintained at a pressure of 2 MPa; 2.5 g of the catalyst were introduced into the feed enclosure (7) at a nitrogen pressure of 2.5 MPa, the cavity (5) of the rotary valve (4) being brought into communication with the storage enclosure (1) and then with the feed enclosure (7). This introduction having been completed, nitrogen was introduced by opening the valve (15) through the gas introduction conduit (8), originating from a source which was at a pressure of 2.7 MPa. The relief valve (13) was permanently opened. Simultaneously to the opening of the valve (15), the blow off valve (12) was opened. The introduction and the circulation of nitrogen in the feed enclosure (7) made it possible to suspend and to entrain the catalyst in the stream of nitrogen and to create a swirling of catalyst particles which were then conveyed into the reactor through the injection pipe (10) in a dilute-phase conveying system. The "saltation velocity" of the catalyst suspension in the injection pipe (10) was about 2 m/sec, and the velocity of nitrogen was about 10 m/sec in the injection pipe (10). As soon as the catalyst was introduced into the reactor (14) the blow off valve (12) was closed, and simultaneously the valve (15) was closed. The introduction sequence lasted 1 second and was repeated 10 times per hour.

I claim:

1. A process for introducing fine particles of a solid into a reactor containing a gas under predetermined pressure above atmospheric pressure through a feed enclosure connected to the reactor by an injection pipe connected at one end to the enclosure and at an opposite end to the reactor through entry means which can be opened to permit conveying gas and said particles to flow from said injection pipe into said reactor and which can be closed to prevent flow of the conveying gas and said particles from said injection pipe into said reactor, said process comprising:

while said entry means is closed, introducing said particles into said feed enclosure and permitting most of the particles to settle at rest;

after most of said particles have settled at rest and while said entry means remains closed, introducing the conveying gas under pressure into said feed enclosure at a position thereon which causes said particles to become suspended in the conveying gas introduced into said enclosure and until a pressure of said conveying gas in said enclosure is higher than said predetermined pressure; and thereafter, opening said entry means and permitting said gas in said feed enclosure with the particles suspended therein to flow from said feed enclosure through said injection pipe and into said reactor.

2. Process according to claim 1 wherein the gas which is introduced into said feed enclosure is directed into said feed enclosure so as to produce a swirling flow of said gas within said feed enclosure.

3. Process according to claim 1 wherein more than 50% by weight of the particles introduced into said feed enclosure settles at rest in the feed enclosure.

4. Process according to claim 1 wherein said gas introduced into said feed enclosure is introducer above an upper level of the particles settled at rest in said feed enclosure.

5. Process according to claim 1 wherein the opening of said entry means is performed simultaneously with or immediately after beginning of the introduction of the gas into the feed enclosure.

6. Process according to claim 1 wherein said entry means is closed immediately after the introducing of the particles into the reactor, and the introducing of the gas into the feed enclosure is stopped simultaneously with or immediately after said entry means is closed immediately after the introducing of the particles into the reactor.

7. Process according to claim 1 wherein said particles are particles of a catalyst for olefin polymerization and the reactor is a gas phase polymerization reactor containing a bed to which said particles are supplied and said predetermined pressure is from 0.1 to 5 MPa.

8. Apparatus for introducing particles of a solid into a reactor, said apparatus comprising:

a feed enclosure for receiving said particles and having an outlet;

means for introducing said particles into said feed enclosure and permitting most of said particles to settle;

means for introducing a gas under pressure above atmospheric pressure into said feed enclosure after most of said particles have settled in said feed enclosure for producing a gas suspension of said particles; and pipe means interconnecting said outlet and the reactor for conveying said gas suspension of said particles from said feed enclosure to and into said reactor, said pipe means including means for preventing substantial flow of said particles into said pipe means by gravity prior to the introducing of said gas into said feed enclosure.

9. Apparatus according to claim 8 wherein said feed enclosure has a top and a bottom and wherein said means for introducing said gas is connected to said feed enclosure above said bottom for introducing said gas into said feed enclosure above said particles which have been permitted to settle.

10. Apparatus according to claim 9 wherein said means for introducing said gas directs said gas into said feed enclosure so that the gas swirls in said enclosure.

11. Apparatus according to claim 10 wherein said feed enclosure has a wall which is circular in cross section and said gas is directed tangentially to said wall.

12. Apparatus according to claim 8 wherein said means for preventing substantial flow of said particles into said pipe means comprises a horizontal length of pipe connected to said outlet.

\* \* \* \* \*

UNITED STATES PATENT AND TRADEMARK OFFICE
CERTIFICATE OF CORRECTION

PATENT NO. : 5,556,238
DATED : September 17, 1996
INVENTOR(S) : JEAN-CLAUDE CHINH It is certified that error appears in the above-indentified patent and that said Letters Patent is hereby corrected as shown below:

Col. 3, l. 28, insert a comma (,) after "kg (2nd occurrence).

Col. 4, l. 29, insert a comma (,) after "e.g., (1st occurrence).

Col. 4, l. 35, insert a comma (,) after "seconds," and after "e.g.,"

Col. 5, l. 22, should read "preferably includes".

Col. 6, l. 25, insert a comma (,) after "40 mm,"

Claim 4, col. 8, line 34, correct the spelling of the word "introduced"

Signed and Sealed this

Twenty-fourth Day of December, 1996

Attest:

BRUCE LEHMAN

Attesting Officer        Commissioner of Patents and Trademarks